United States Patent Office 3,469,243
Patented Sept. 23, 1969

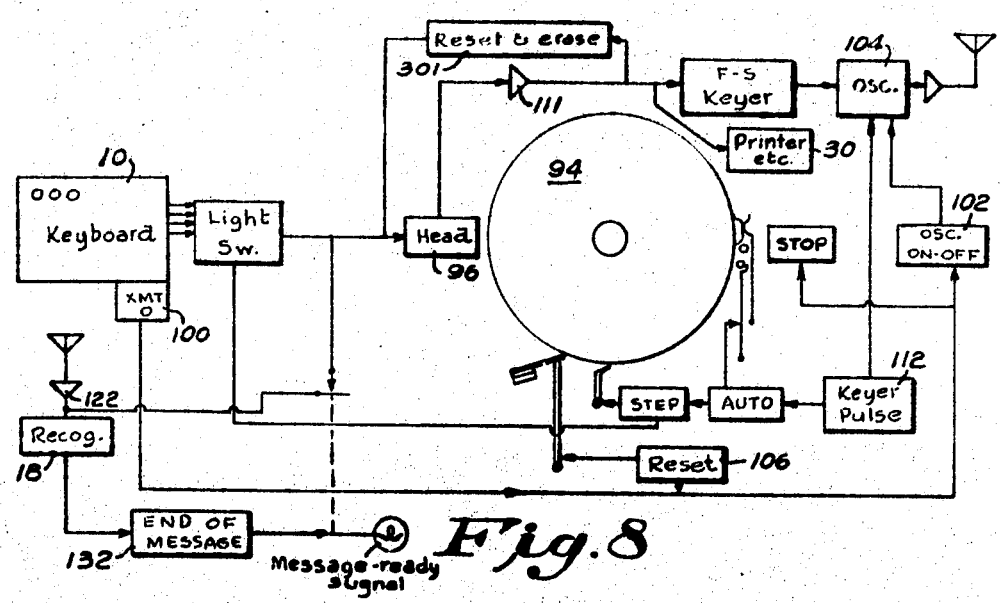
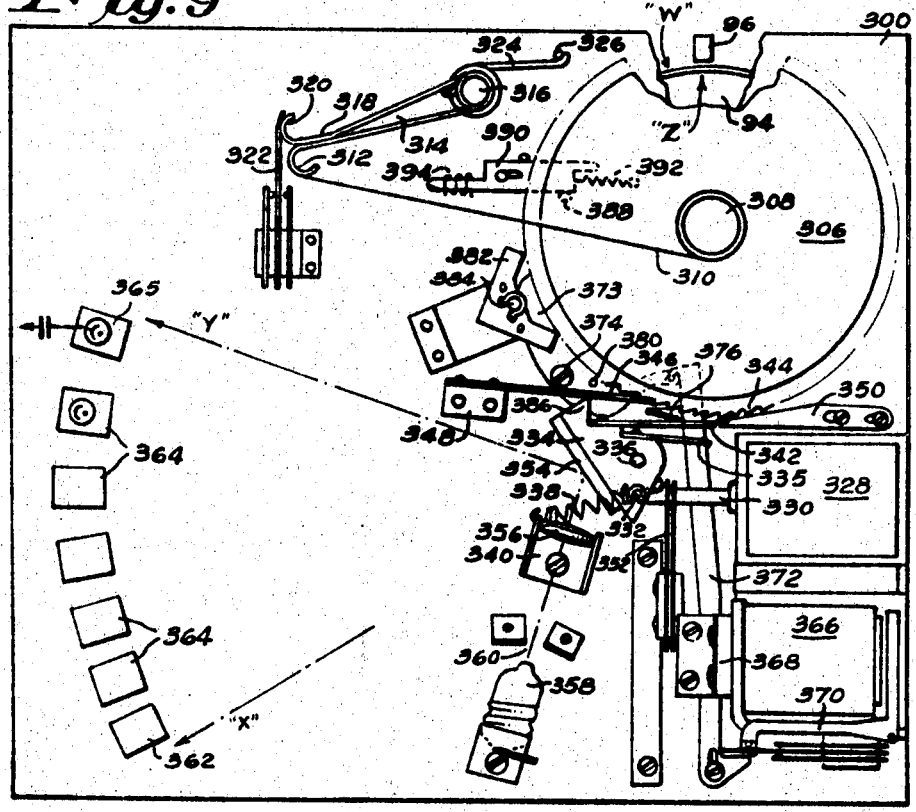

3,469,243
RECEIVING STATION FOR SELECTIVE-CALL DATA SYSTEM
Frederick P. Willcox, 261—1 Oenoke Ridge, New Canaan, Conn. 06840, and Newland F. Smith, New Canaan, Conn.; said Smith assignor to said Willcox
Original application May 12, 1964, Ser. No. 366,792, now Patent No. 3,314,051, dated Apr. 11, 1967. Divided and this application Mar. 29, 1967, Ser. No. 644,417
Int. Cl. G06f 7/00, 15/00
U.S. Cl. 340—172.5
2 Claims

ABSTRACT OF THE DISCLOSURE

A coded data-storage query and response system including a central data storage and look-up station accessible to a plurality of channel-sharing remote inquiry stations. Means are provided to affix to each query message (from a remote station) a station-identifying code group or groups which are repeated as an address prefix to the response from the central station, and each remote station is provided with means for recognizing its own address code and thereby enabling the storage and subsequent display of the remaining characters of the message. To enable the central station to communicate with all remote stations on a channel, when required, the remote stations are also arranged to receive and display any message prefixed by a distinctive "all-stations" signal.

This is a division of Ser. No. 366,792, filed May 12, 1964, now Patent No. 3,314,051 dated Apr. 11, 1967.

This invention has to do with systems for the communication of data or information between (A) a central information store and at least one associated message receiver and transmitter, and (B) a plurality of outlying interrogation stations each equipped with (C) a transmitter and a receiver, (D) means for encoding, for transmission to the central station, a data-form inquiry, and (E) means for decoding data-form replies from said central information store and presenting them to the operator of the remote station which originated that particular inquiry.

In an earlier application, Ser. No. 235,067 filed Nov. 2, 1962, a system of the above general type was disclosed and claimed, utilizing at each remote or outlying station a manual keyboard for encoding an information query, the data-form answer or response from the central station being recorded automatically at all of the remote stations. The response was thus available for decoding and presentation on the command not only of the remote-station operator who originated the query, but of all other remote-station operators.

The system of said previous application also required the manual encoding at, and transmission from, each remote station initiating an injury, of the identification (or "number") of said coded station, in addition to the coded message or query, which identification was stored at the central station and included in the reply message intended for that remote station. While that system tended to minimize the possibility that any remote station operator would act erroneously upon a message intended for a different remote station, it did not absolutely prevent such an occurrence. Also, of course, the manual (keyboard) encoding of the remote-station identification was subject to the usual possibility of human errors, as was the comprehension of the returning (or "confirmation") remote-station identification.

The present invention aims to solve the foregoing problems by providing a system in which the equipment provided at each remote or outlying station transmits automatically, as an incident in the initiation of an inquiry message, the identification coding which is assigned to that station. This identification coding is registered at the central station, and is automatically retransmitted by it at the beginning of the "answer." Moreover, the automatically retransmitted identification coding is utilized to prevent the decoding of the accompanying "answer" at all remote stations other than that one which had originated the inquiry. This system thus eliminates the need for the human operator to supply the identification coding, reduces the danger of human errors in both supplying and recognizing the identification codes, and provides a desirable measure of privacy for the response information.

For use when a general alarm, or all-points bulletin, originated at the central station, is to be received and noted at all the remote stations, the latter are equipped with means for detecting and integrating a special long-pulse signal in place of the usual station-identification codes, to override the station selection feature and thus to allow decoding and reproduction of such a general message of the remotely-received "all-station" type.

Where a system of this kind, and as described in the earlier application, uses as a coding device at each remote station a manual keyboard or other parallel-output source for the code bits, the bits are normally read out in serial form to control the communication channel. Even when the system includes, between the keyboard and the communication channel, an interim storage device such as a parallel-channel set of storage capacitors and/or a parallel-channel magnetic storage buffer, it is usually desirable (for timing purposes) to utilize a ring counter, distributor or commutator in the pulse-routing system.

The system of the present application includes such a ring counter or distributor, and, as will appear, is so arranged as to utilize the same distributor for control of the logic gating means of the identification code recognizer, and also for the distribution of message codes to the proper output control selectors of an aural and/or visual (e.g., message printer) read-out device. In this and in other respects, as will appear, the present invention is specially designed so as to maximize the efficient utilization of required components for plural functions or purposes, to the ends of equipment simplification, compactness, and reduced cost.

The invention will be described herein in connection with certain preferred embodiments, illustrated in the accompanying drawings, in which.

Figure 3:
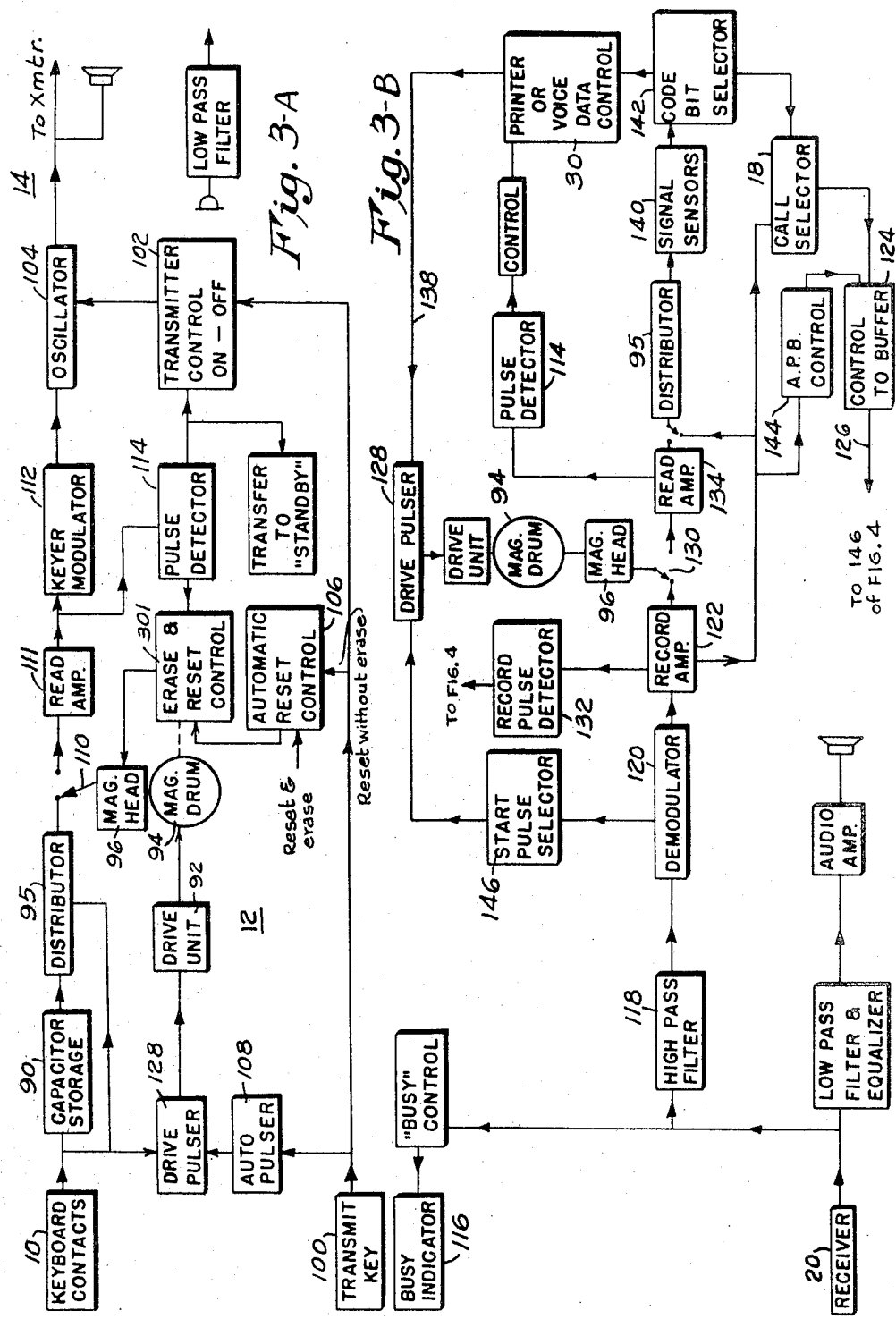

FIG. 3–A is a block diagram of the major components and interconnections at a typical remote station, including the components used for encoding a data-form inquiry and transmitting it to the central station, and (FIG. 3–B) showing components as used for receiving and decoding a reply from that central station.

Figure 4:
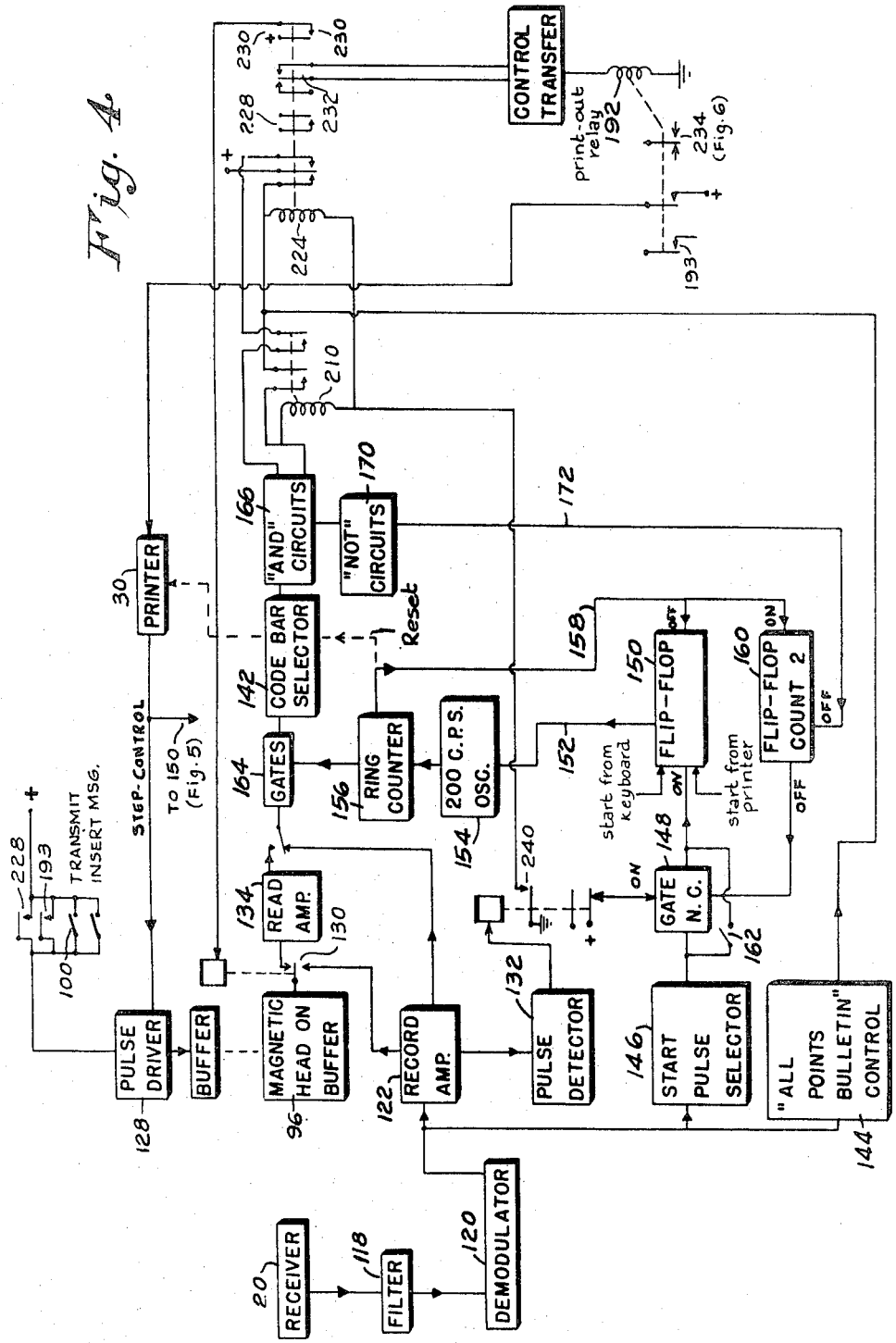

FIG. 4 is a similar block diagram of the equipment at the remote station, showing in greater detail those portions associated with automatic station-code recognition and the control thereby of the printing-out (or other manifestation) of the reply message.

Figure 5:
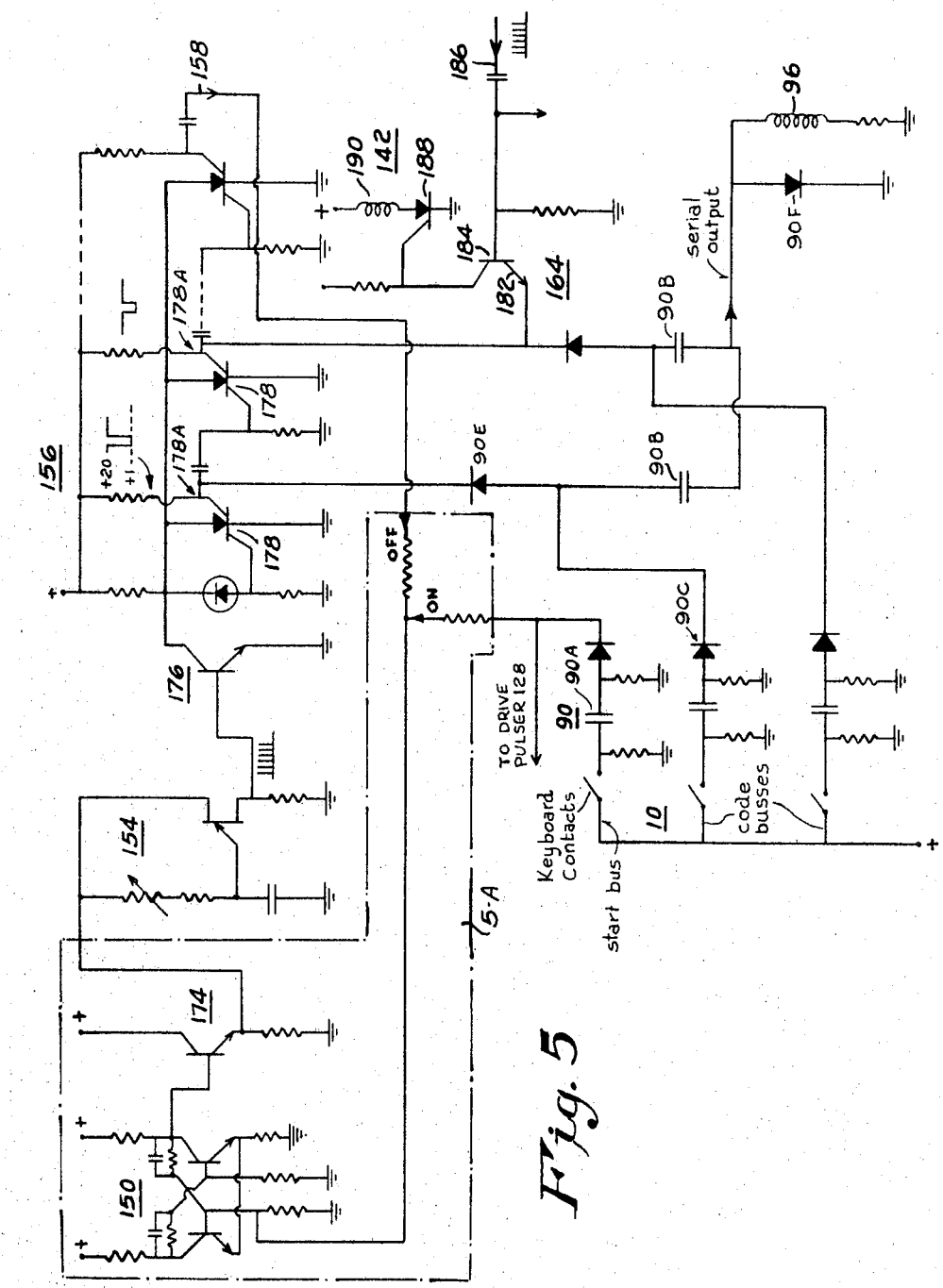

FIG. 5 is a schematic wiring diagram of a typical solid-state ring counter distributor which is used at the remote station during the manual encoding of a data-form inquiry at the keyboard, and also during the reception and read-out of the reply message.

Figure 6:
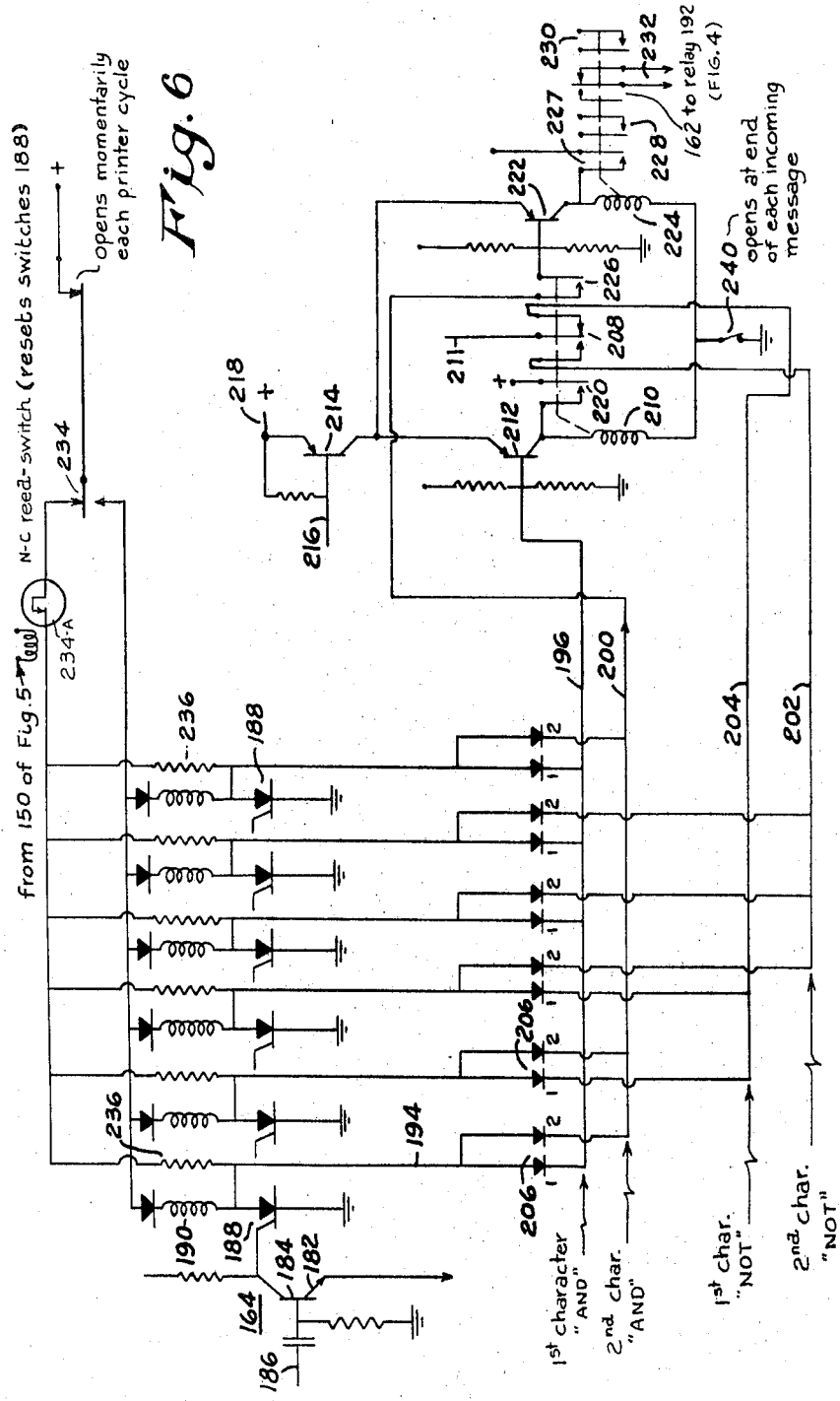

FIG. 6 is a similar schematic diagram of the circuitry which selectively "enables" the operation of the reply-message manifesting or display equipment at the proper remote station, and thereupon selectively operates the manifesting equipment to decode and present the message content; for example, by the selective operation of the code bars of a mechanical printer or the like.

Figure 7:
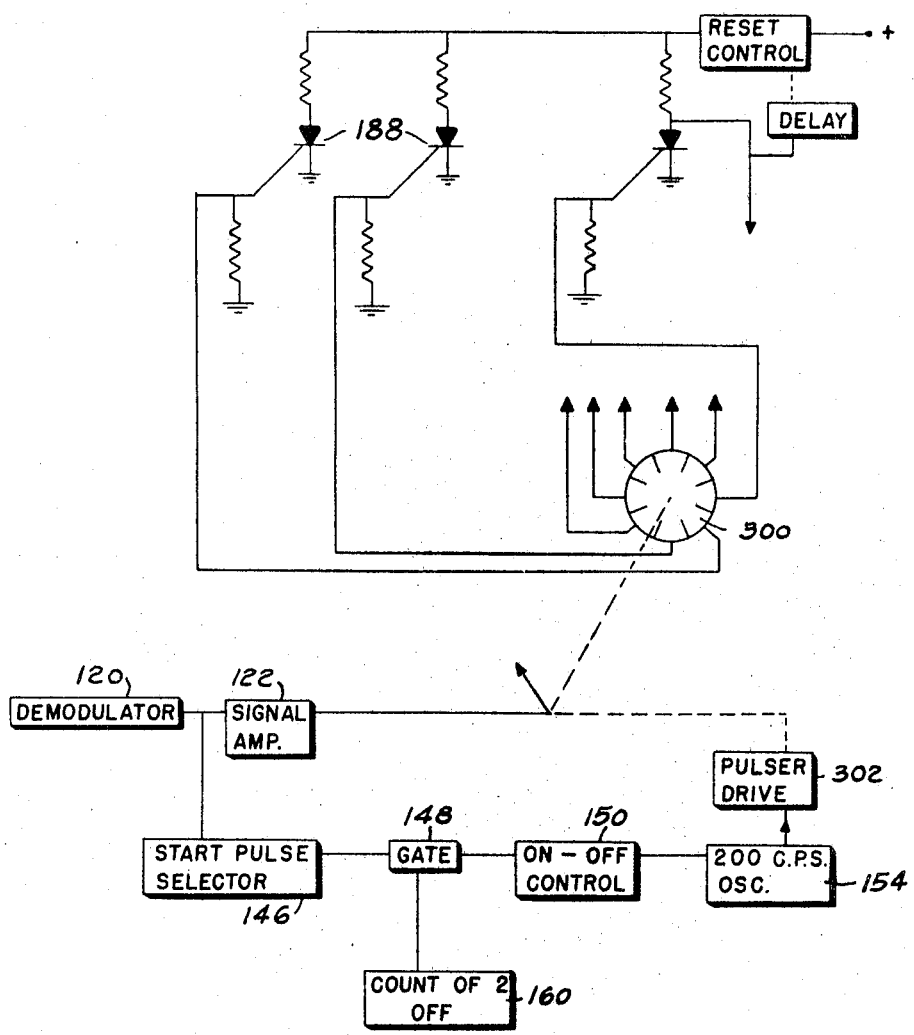

FIG. 7 is a diagram of an alternate form of pulse distributor which can be substituted for the ring counter distributor of FIG. 5, utilizing electromechanical components instead of certain of the purely electronic components thereof.

FIG. 8 is a schematic diagram showing the application to the system of a magnetic-disc buffer storage mechanism.

FIG. 9 is a plan view detailing a preferred physical construction of such buffer storage mechanism.

GENERAL ORGANIZATION OF SYSTEM

Figure 1:
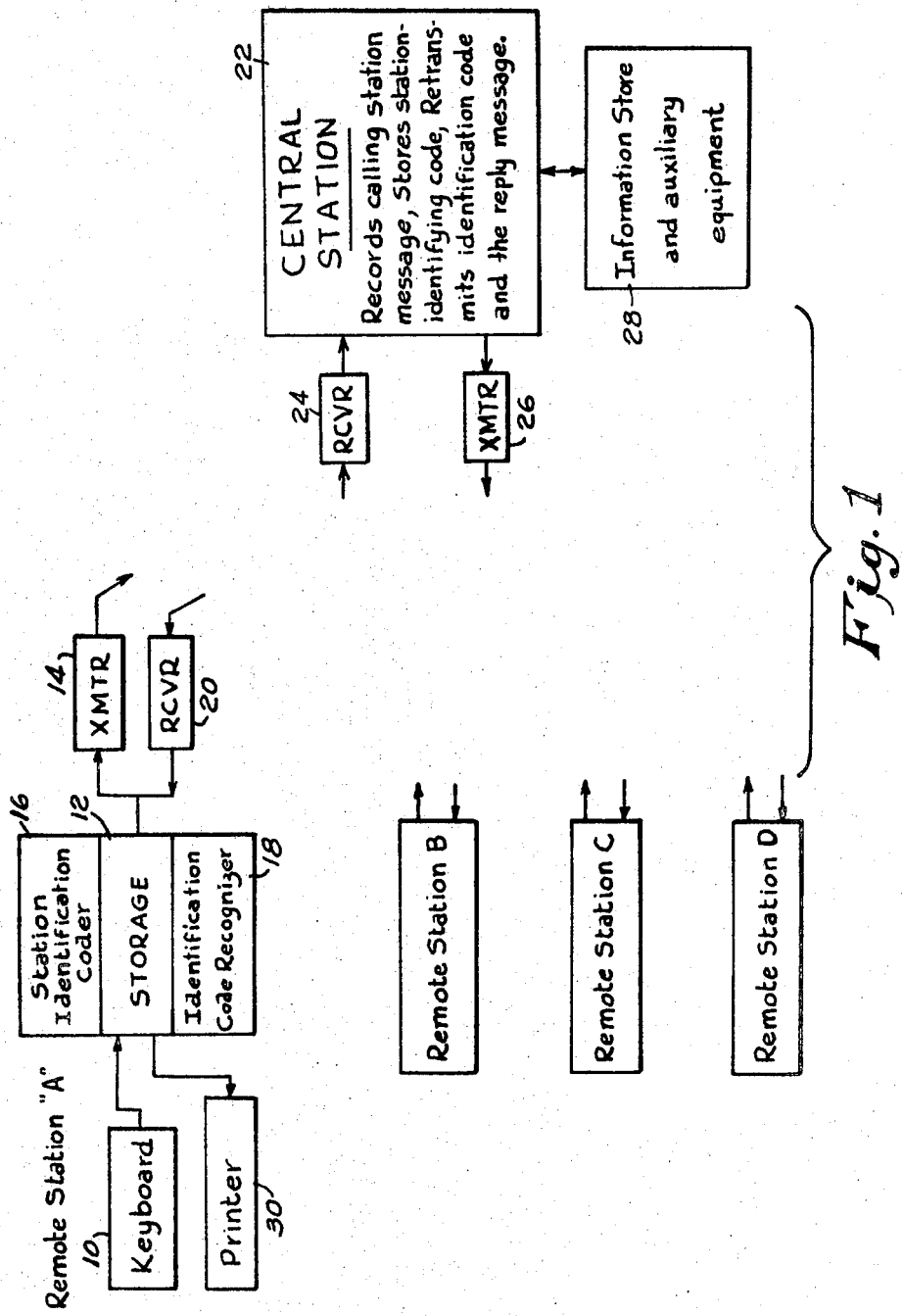
FIG. 1 is a block diagram showing the overall arrangement of major components at opposite ends of a typical radio-wave inquiry and response system according to the invention.

FIG. 1 shows schematically the general organization of a complete system of the type with which the invention is concerned. At the left, four typical remote stations (which may be mobile stations) are illustrated, to represent a much larger number in practice. The total number of remote stations or cars may be broken into groups with each group operating on a particular carrier frequency. Since the remote stations (except for such a possible difference in carrier frequency) differ structurally from one another only in being assigned different and individual station-identifying codes, only Station A has been expanded to show its general functions. A keyboard or like manual encoding device 10 is used to record in storage 12 the on-off pulse-code digits or characters (code groups) of an inquiry message (such as an automobile license number as to which information is desired, as described in the earlier application). This inquiry message will ultimately be transmitted, as over a radio transmitter 14.

In order to append to the inquiry message a station-identifying code (which will be unique to station A), storage 12 has associated with it an arrangement 16 for supplying one or more identification characters, preferably also as on-off pulse bit trains or groups, as a prefix to the pulse groups constituting the inquiry. Where the storage device is a magnetic-recording disc, drum or the like also used to record an incoming or reply message, the identification code may be constituted by a suitable set of pulse groups relatively permanently recorded on the record medium in advance of the space thereon devoted to other and variable message portions. When used to transmit an inquiry message, then, this arrangement ensures that the station-identifying code groups will automatically be transmitted in advance of the body of the inquiry message itself.

Storage 12 also has associated with it an identification-code recognizer 18 for use when a reply is received by its radio receiver 20. As will be described below, the central station 22, having received over its radio receiver 24 the complete inquiry message from a remote station, temporarily stores or records the initial or prefix code groups which identify the calling station (such as Station A), and holds these for use as a prefix to the reply message which it will later transmit over its transmitter 26. The remainder of the incoming inquiry message (after the prefix codes) is processed in the same way as described in the earlier application, to obtain the requested information as from store 28. The central station then transmits over 26 a reply message constituted by the calling station's identifying code groups followed by the body of the reply. If desired, the characters of the inquiry message may also be sent back as a verification, along with the reply information.

This reply message will ordinarily be received at many or all of the remote stations (A, B, C, etc.) operating on one frequency, but according to the invention, it will nevertheless be recorded and mainifested only at the individual station which originated the corresponding inquiry. Thus, in the case of station A, receipt of the reply with the prefixed identification code groups for that station will be "recognised" by the code recognizer 18, preset to respond to those initial code groups. The recognizer 18 will thus permit the remaining body of the reply message to be recorded (preferably in the same storage device 12 earlier used in sending the inquiry) and thereafter decoded and manifested to the operator by means such as indicated by printer 30 or an equivalent display instrumentality, voice record unit or the like.

ORGANIZATION OF CENTRAL STATION

Figure 2:
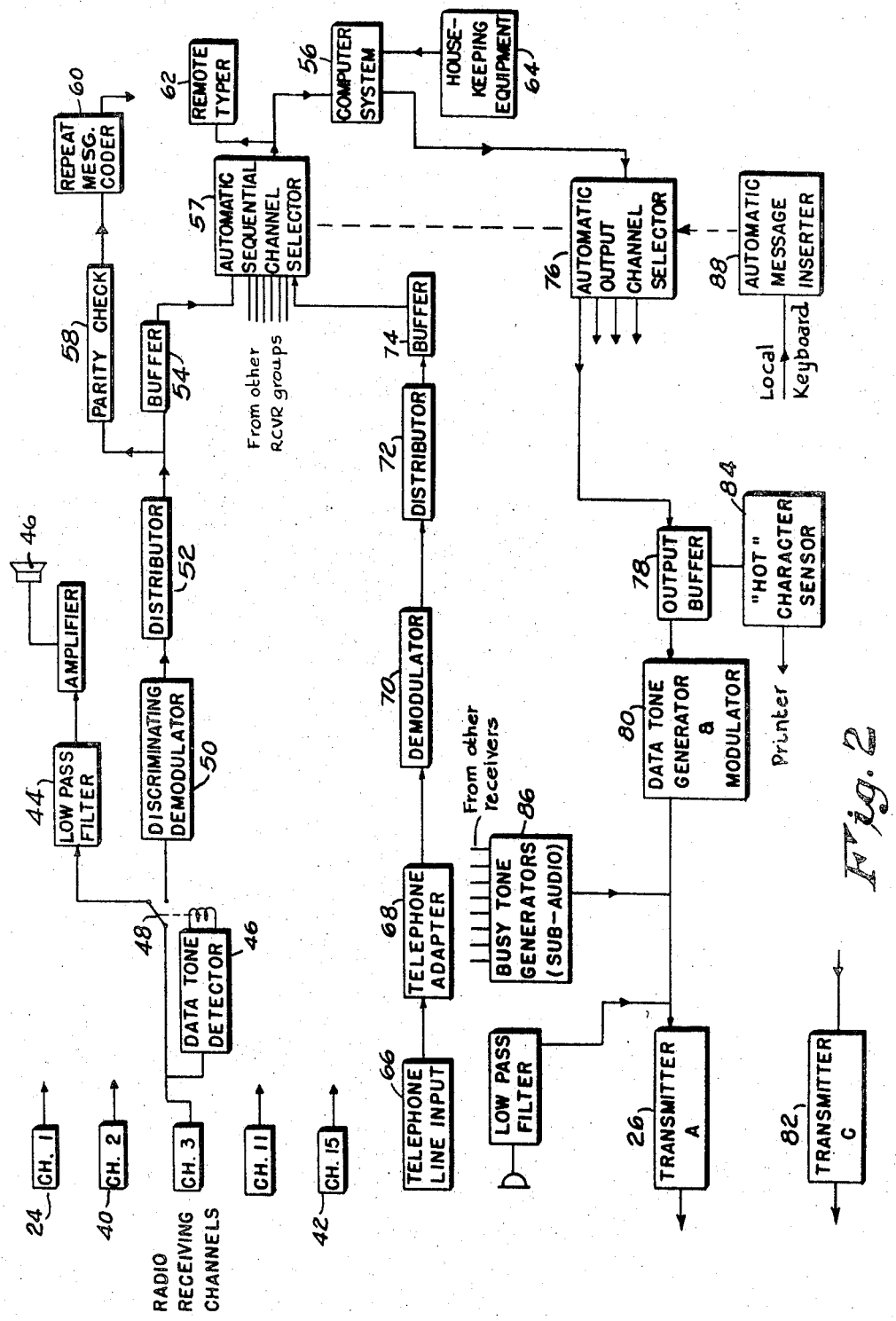
FIG. 2 is a block diagram showing in greater detail the arrangement of equipment at the central station only.

With the foregoing description in mind, the more detailed construction and operation of the central station can be apprehended from FIG. 2. In the same general way as described in the earlier application, this central station will usually have a plurality of radio receivers 24, 40, 42 et cetera tuned to different frequency bands, each band however being shared by a plurality of remote stations. Amongst the remote stations sharing each band, selection of a particularly station to effectively receive the message intended for it will be accomplished by prefix code recognition. Voice calls from all remote stations are routed through a low-pass filter 44 to a loudspeaker 46 in the usual way. The data tones are transmitted in the upper end of the audio pass band. When a data code message (inquiry) is received from any of the remote stations, the pulse-tone detector 46 operates a relay switch 48 to convey the data inquiry pulse groups (including the recognition prefix) to discriminator-demodulator 50 and thence to a distributor 52 which will connect this channel to an input buffer storage 54 which records and holds the message until, in turn with other inquiries, it is supplied to the storage, look-up and readout system indicated as "computer" 56, by a sequential channel selector 57.

Also, the distributor 52 extends the incoming message inquiry to a parity-check error-sensing system 58, and in the event of a parity error in any code group of the message, this circuit operates a "repeat message" signalling device 60 which causes transmitter 26 to send the remote station a signal which operates a signal lamp or the like to advise the operator that a second transmission is needed. These features are generally as described in the earlier case, and are included here for completeness, as are the remote typer 62, computer housekeeping equipment 64 and certain other components noted below.

Also as described in the prior application, provision is made for allowing the "computer" storage and look-up facility to receive data-form inquires from other sources, such as over a telephone line input 66 providing inquiry code messages through data pulse adapter 68 to a demodulator 70, distributor 72, buffer 74 and to one of the input channels of selector 57. In selecting (by sequential scanning or the like) one inquiry channel at a time for connection to the computer storage 56, selector 57 simultaneously controls an output selector 76 to connect the output (answer) signals from the computer storage 56 to the appropriate radio transmitter 26 (or other output channel such as a telephone line when used) for transmitting the "answer" to the station originating the inquiry. In the case of an answer to be radioed to the inquiry station, this arrangement will operate to send the "answer" data bits from the computer to the appropriate transmitter 26 for transmission on a carrier frequency suitable to the remote station that initiated the inquiry, or to the group of common-frequency stations that includes it.

The channel from output selector 76 passes through a buffer 78 to the data tone generator and carrier modulator 80 to control the appropriate transmitter 26, 82 or the like of the group of transmitters. As in the earlier case, if the reply message read out from storage 56 includes a code designating a special-interest or "hot" piece of information, a sensor 84 recognize that special code designation, and causes the extension of the same reply message to supervisory personnel (as at a separate printer) for attention and/or action. Provisions for applying a subaudio busy tone (in the range, say, of 100 to 200 cycles per second) to the carrier output of each transmitter such as 26, whenever any remote station of the group served by that transmitter has commenced transmitting an inquiry message, include a busy tone generator 86 (one output for each transmitter) energized from all the outputs of the receivers 24, 40 et cetera in that group.

Provision is made for appending, to any message proceeding from the computer storage to the transmitter, additional code groups supplied from a keyboard or the like at a supervisory position. This equipment, indicated at 88, merely interrupts the sequencing operation of selectors 57 and 76, while the additional pulse codes or groups are applied from 88 to the output channel. If it is desired to dispatch an "all-points" bulletin to all of the remote stations, equipment 88 provides for transmitting a preliminary long pulse (say of 30 milliseconds duration) which will be received and recognized at all the remote stations on that channel or channels to which it is thus applied. This recognition of the long pulse will cause disabling of their station-recognition lock-out circuits, to allow such a message to be manifested at all of them.

It is recalled here that, in connection with the special features of the present improvements of the earlier case, the train of pulse groups forming a data-form inquiry includes a prefix set of groups identifying the calling remote station, and a set of code groups constituting the question (such as a license number designation). Both these sets of code groups are temporarily stored in a section of the computer storage 56 while the sought information is obtained from another section of its storage, and thereupon the computer supplies (over the channel to the output selector 76) the reply message. The latter thus consists of the remote-station identifying prefix groups, preferably followed by the groups that constituted the inquiry subject-matter, in turn followed by the groups constituting the reply information. The prefix groups, when received at several remote stations on the same carrier frequency, are unrecognized at all stations except the one, and further receiver actions are not initiated at those un-addressed stations. The repetition of the inquiry subject-matter groups, if used, provides a check on the accuracy of correspondence with the true subject of inquiry, and the remaining groups manifest the desired reply information to the operator.

ORGANIZATION OF TYPICAL REMOTE STATION

Message transmission

As shown in more detail in FIG. 3–A, the arrangement at each remote station, except for variations involved with the special purposes of the present improvements, is similar to that described in the previous application. In preparing for transmission, an "insert message" keyboard switch is closed, and thereafter the manual contact code switches of the keyboard are operated in turn to selectively charge storage capacitors 90 of a plurality thereof corresponding to the number of bits in each standard code group; the first bit is always a distinctive "start" (mark) pulse; e.g., an extra long pulse, or one of tone frequency deviation such as to produce a greater amplitude at the discriminator output. Each keyboard switch operation pulses (advances) the mechanical step drive 92 of magnetic recorder disc or drum 94, and at the same time the capacitor-stored bits (parallel coding) are serially distributed by distributor or ring counter 95 to the record-reproduce head 96 for recording on the magnetic medium 94.

At a position in advance of this section of the recording medium, the serial bit groups designating this particular remote station have been semi-permanently recorded on the same medium. Each keyboard contact group operation thus records a data-form inquiry code group in turn on the storage medium, these being arranged after the codes of the station designation. In speaking of these station-identifying codes as being semi-permanently recorded, what is meant is that they are never erased by the operation of the station itself (as are the message codes after they have been manifested or transmitted), but can be changed from time to time in case a change in station designation is desirable.

When the inquiry message has been completely recorded on the magnetic medium by operation of keyboard keys, and if the station channel's "busy" indicator 116 is not activated, the operator closes "transmit" key 100 which energizes the transmitter on-off control 102 to initiate carrier generation to the antenna, and energizes frequency-shift keying oscillator 104. Transmission of the base-frequency tone to the central station commences, activating the central station data circuits and de-activating its audio or voice circuits. During this preparatory period of a few tenths of a second, the "transmit" key operation has also energized the reset control 106, causing the magnetic drum to return without erasing to a position at which the commencement of the message groups (including the prefix groups which identify the station) will pass in turn beneath the record-reproduce head 96 during the next forward rotation of the magnetic disc or drum. Arrival of the disc or drum at this starting point energizes the automatic pulser 108 to commence, again, forward step motion of the drum 94, and switch 110 operates to connect the head output through amplifier 111 to the keyer-modulator 112 (to transmit the code groups by frequency-shift keying) and to the pulse detector 114 which will sense the end of the message (by the absence of pulses), and, by its connection to the drum drive control, will cause the drum or disc to restore to its position at the commencement of the recording region. During this restoration action, the recorded code bits will be erased from the magnetic medium, but the stopping point of the drum is such that the station-identifying prefix codes are not reached or erased. The pulse detector also switches off the transmitter control 102, and transfers the equipment to standby condition.

Reply message reception

In FIG. 3–B, the components used for reception at a remote station are shown. When the central station transmitter used on this channel transmits the reply message, it is received on all remote station receivers, but is manifested only through the receiver 20 of the remote station having the proper prefix code. Thus, at all the remote stations of this carrier-frequency group, the "busy" indicator 116 is energized (preventing the operators at the other remote stations from initiating other queries), and reply message groups passing through high-pass filter 118 are demodulated at 120.

The prefix pulse groups, for station identification, proceed from the recording amplifier 122 to the call selector apparatus 18, and only if they satisfy the logic connections for this station (in other words, are recognized) does the call selector operate control 124 to initiate recording of the remaining pulse groups by connection 126. Thus, the drive pulser 128 is energized to step the magnetic drum 94, and record amplifier 122 is switched to the magnetic record-reproduce head 96 at 130.

Upon completion of the recording of the message, detector 132 responds to the cessation of received pulses, and by the automatic reset control 106 described above, restores the drum to its starting position, and switches the record-reproduce head (by switch 130) to the read-out amplifier 134. The automatic reset of the drum, in this case, carries it to a position in which the recorded message groups are ready for read-out, but not the "farther-back" point at which the station-identifying codes will be read out. As each pulse group (character, letter, or number) is manifested by the printer 30, a connection 138 to the drive pulser initiates read-out of the next group by means of drive pulser 128. The read amplifier 134 directs the reproduced pulse groups to distributor 95 which reconstitutes the bits into parallel form for decoding at 140 and operation of the selector bars (for example) 142 to control the printer character selection.

If an "all-points" bulletin signal (long pulse) arrives at the recording amplifier, it is recognized at 144 which over-rides the call selector 18, so that all remote stations will record and manifest the following message. When no more pulses are read out following the end of any message, the time-delayed detector 114 deactivates the printer 30 and returns the magnetic drum to its standby condition, erasing the message codes which have been read out. The transmitter, oscillator and other power-drawing components of the station are also placed in standby condition.

REMOTE STATION RECOGNITION SYSTEM

While the preceding description explains the general operation of the remote station in "recognizing" its individual prefix code groups, a more detailed understanding will be provided by the following description of a typical and preferred circuit arrangement for a two-character recognition code prefix, with reference to FIG. 4 of the drawings. Parts already described carry the same reference numerals. Demodulated signals in the data-form message reach the recording amplifier 122 as already described, and the distinctive "start" pulse of the first group passes start-pulse selector 146 and the normally-closed (conducting) gate 148 and turns on the flip-flop 150, which by its output lead 152 turns on the 200 c.p.s. oscillator 154 driving the 8-step ring counter 156. When the counter reaches its last step, it resets itself and (over lead 158) turns off the flip-flop, discontinuing oscillations. Over this same lead 158, the resetting of the ring counter also turns "on" the Count-2 flip-flops 160.

When the next (second) prefix character arrives, it operates just as above, but upon completion of the ring counter operation, and energization of Count-2 flip-flop 160, the latter turns "off" (opens) the normally closed gate 148. Thus, and as explained more fully below, no more than the desired two prefix groups can reach the station recognition system. However, the gate 148 is again restored to closed condition at the end of each full message as described below, and will always be by-passed by the relay contacts 162 responding to the all-points bulletin control 144, to over-ride the recognition system.

The last six stages of ring-counter 156, corresponding to the information bits of each code group, are coupled to respective primary inputs of individual gates indicated at 164, and the incoming prefix signals from the recording amplifier are applied to respective secondary inputs of these gates. The coincidence, in time, of a signal pulse on a primary input lead, and a ring-counter pulse on the corresponding secondary input lead, allows the signal to appear as a negative pulse at the output of that gate. The respective gate outputs are directly coupled to switches (preferably silicon controlled switches) in the code bar selector 142. Where these bars are solenoid operated, and since the prefix code groups are not to be printed, the solenoid coils are disconnected by a relay (below) and dummy resistances are substituted as output loads, until completion of the recognition operations. Thereafter, the code bars selected in accordance with the mark and space pattern of each code group will control the printer 30, but in this case the code groups will first have been recorded and will then reach the code bar selector from the read amplifier 134.

During the address or recognition phase, however, the output of the gates 164 either directly or (as shown) through the connections to the selector 142, are applied via "and" circuits 166 to a relay system for energizing the magnetic storage system and drives, and to shift contacts 130 so as to apply later message codes to the magnetic recording head 96. If all the mark bits called for by the particular station's recognition code are present at the output of the "and" circuits, and if no "not" circuits 170 are energized, the relay system will cause recording of the remainder of the groups. Operation of any "not" circuit, or failure of any required "and" output, however, will produce a pulse on lead 172 to re-set flip-flop 160 "off," and the further code groups will be ignored, the recognition system automatically returning to its standby condition.

FIG. 5 details typical circuitry of the keyboard 10, flip-flop 150, oscillator 154, ring counter 156, gate 164 and code bar selector 142, all of FIG. 4. These components are internally of known construction using solidstate (semi-conductor) devices as shown. However, they are interconnected in a novel way to minimize the number of components required to accomplish the totality of useful functions performed. Thus, the changeover in usage of these circuit elements from one application to another is accomplished without any actual circuit switching: i.e., the various circuit elements are all tied together at all times, but due to the fact that their inputs and outputs are selectively energized or not energized depending upon the overall condition of operation, they perform these respective and different functions. The cost and complexity are minimized (as well as maintenance facilitated) by the multiple or common usage of circuit elements in this way.

FIGURE 5 CIRCUIT DESCRIPTION

FIGURE 5 shows the circuitry involved for the ring counter distributor which is common as between the conditions of: (a) insert message from keyboard, (b) receive and identify called station, (c) receive and record in buffer, and (d) playback from buffer to printer or voice data unit.

Section 5A indicated in dash lines is merely a simple means for turning off and on the plus (positive) voltage to the oscillator 154. It consists simply of a standard type of flip-flop 150, followed by an emitter-follower 174, to provide a low impedance source of current for the oscillator.

Oscillator 154 is a simple and stable type of unijunction transistor oscillator as described in General Electric Company application notes and other publications. It produces short duration, periodically spaced pulses in its output base resistor, which pulses occur at the oscillator frequency, in this typical case at 200 c.p.s. These pulses start immediately as the flip-flop 150 is turned on. They also stop immediately when the flip-flop is turned off. The flip-flop 150 can be turned on by either (a) the start bus contact of any of the keyboard contact sets, (b) a start pulse from an incoming received signal, or (c) on playback from the buffer storage device, from the start pulse that is derived from playback of each character. In all cases the flip-flop 150 is turned off when the ring counter reaches the last stage. This is accomplished by feeding back a pulse of such polarity from the last stage (point 158) into the flip-flop as to produce a reversal of its condition. Thus the oscillator 154 is turned off, and the ring counter is reset.

The ring counter itself consists of a driver stage 176 and eight silicon controlled switches, numbered 178. This type of ring counter circuit offers simplicity in the number of circuit elements used, and is described in the GE Transistor Manual, Sixth Edition, among other places. Commutation leads are taken out of the ring counter in all stages at the same (electrically equivalent) points: i.e., at the anode gate point 178A. During the time that a particular silicon switch is on, this point presents a low impedance to ground, and thus is periodically at either the plus supply voltage, or approximately down to plus one volt, as indicated on the drawing.

Insert Message Condition (FIGURE 5).—In this condition various characters are inserted by operation of the keyboard contact-sets, and the corresponding information bits are stored serially on a single track of the magnetic buffer storage device to be described below.

As each keyboard character key is closed, various combinations of the contacts are made. These contacts charge the storage capacitors 90 accordingly. The start bus capacitor 90A supplies a positive start voltage momentarily to the flip-flop 150. This, of course, turns on the ring counter 156 for one character period. As each stage of the ring counter is switched on in sequence, the corresponding capacitor 90B (which previously had been charged positively through capacitor 90 and diode 90C) discharges through diode 90E and the magnetic recording head 96. Each bit is thus recorded on the magnetic drum which is rotating incrementally under the magnetic head. The bits are spaced on the drum, therefore, in accordance with the timing of the ring counter steps. Diode 90F provides a low impedance path during the charge of capacitor 90B, yet is effectively out of the circuit during the discharge of the capacitor 90B through the magnetic head and the ring counter commutator.

If only a serial bit output is required, or (say) direct data transmission over a line, it can readily be obtained by placing a load resistor in place of head winding 96 and utilizing the voltages developed across this resistor during the corresponding commutation intervals. This would (in the present case) constitute a series of negative pulses, corresponding to the code bits of each character selected.

Conditions requiring serial-to-parallel conversion.— This conversion function is employed in the conditions of (a) receiving with selective station-calling, (b) receiving and recording on buffer storage, and (c) playback from the buffer storage to a printer or voice data unit. In these cases the serial bit input at 186 is distributed by means of the ring counter and gating circuits to turn on the six code-bit silicon controlled switches 188, in accordance with their corresponding bit positions.

Again, the ring counter flip-flop 150 is turned on by the start pulse at the beginning of each character group, through circuitry shown elsewhere. This serial signal input is fed simultaneously to six gating transistors 184. The collector of each of these transistors is tied directly to the anode gate of a corresponding code-bit silicon controlled switch 188. The emitter of each of these gating transistors (182) is tied to the corresponding stage of the ring counter at the commutation point, 178A. No current will flow through the collector circuit of transistor 184 unless there is a coincidence of (a) the commutation voltage at 178A, being down to plus one volt, and (b) the base voltage of 184 being fed with a positive pulse at the same instant. When this condition does occur, the anode gate of the silicon controlled switch 188 is driven more negative than the anode itself, so the switch becomes conductive and is turned "on." At the end of each character period, therefore, the set of six code-bit silicon switches 188 remain on in accordance with the "mark" bits that were presently serially at the input.

For this operation the incoming serial input can, of course, come from either the buffer storage output (after amplification by the playback amplifier) or from the receiver demodulator output directly.

FIGURE 6 CIRCUIT DESCRIPTION

Silicon controlled switch 188 and the six gating circuits 164 are the same circuit elements shown in the previously described FIGURE 5. The coils 190 in the anodes of each of the code bit silicon switches are the code coils that set up either the actual bit positions (mark vs. space) in a printer or the code coil controlled apertures in the voice data unit. During the selective station-calling period, that is, before an incoming message has caused identification of the specified receiving station, relay contact 234 is in its normally closed or up position, as shown in FIGURE 6. During playback from the buffer storage, or during actual printing conditions, contact 234 is pulled down and the code coils are then energized, by the corresponding silicon controlled switches 188, instead of the load resistors 236, which are only used during the station identification operation.

Station identification operation.—This FIG. 6 circuit is so drawn as to illustrate the use of the first two characters of a message to identify and turn on the particular station receiving and/or recording equipment for which it is intended. It could, of course, be extended to three or more identifying characters as might be required. The identity of a specific station is set up by the wiring of the two groups of diodes 206, on specific bit positions. As shown, the group 206–1 (the suffixes here denote the respective diodes of the pairs shown in FIG. 6) is set up for the first character identification, and the other group 206–2 is set up for the second character identification. Therefore, for the first character the proper bits for an "and" condition are tied in to bus 196, while for a "not" condition they are tied in with bus 204. Correspondingly, the diodes for the second character group are tied in with busses 200 and 202 respectively for "and" and "not" functions. This diode logic is used to sense the condition of the six silicon controlled switches 188, as each character code combination is established.

The actual sensing, of course, has to be performed at the end of each character period, just before the silicon switches are reset for the following character. This is done by turning on a control transistor 214 momentarily at the end of each ring counter period.

The "and" circuitry requires that all of the silicon controlled switches 188 which are tied through the diodes to the "and" bus, be in an "on" condition at the end of the character period. This combination will turn on a transistor 212 and energize relay coil 210. If during this first character period any one of the silicon switches which is tied through its corresponding diode to a "not" bus, is also turned on, this change of voltage will feed through the normally closed contact 208 and out on 211 to turn off the ring counter flip-flop 150, and also turn off the "count two" flip-flop (160 of FIGURE 4). This will prevent control transistor 212 from being turned on and will also open the input gate, preventing any further characters from being set up until another message has commenced.

If conditions have been properly met on the first character, relay coil 210 is then energized, and the relay held operated by holding contact 220. This closes contact number 226, which transfers the second character "and" bus to the control transistor 222. Also the second character "not" bus is transferred through contact 208 to the point 211.

In the same way, the second character is either identified or, in case it is rejected, the "not" circuit again turns off the ring counter and resets the "count two" flip-flop, turning off the input gate for the rest of the message.

When the second incoming character matches the wiring of the diode logic 206, the second control transistor 222 is turned on, energizing relay coil 224. Relay 224 is held operated, if in fact operated, by its contacts 227, and its contacts 228 energize the magnetic recorder storage circuits as already described. Its contacts 230 operate the switch relay for contacts 168 of FIG. 4 to connect the recording amplifier 122 to the recording head 96, and its contacts 232 energize relay 192 (FIG. 4) whose contacts 234 (FIG. 6) supply the code bit selector bar coils 190 with operating current. These coils were by-passed, it will be recalled, by dummy load resistors 236 during the recognition operations involving the prefix codes.

The running through of the ring counter for a second go-around also resets the "count two" flip-flop, turning off the input gate for the rest of that message. This prevents any other possible combination of characters in a given message from energizing this second control transistor, if it had not previously been turned on. Relay coils 210 and 224 are turned off at the end of each incoming message through the contact 240. This contact is closed at the beginning of each incoming message by the "pulse detector" 132 (FIG. 4) fed from the recording amplifier.

The silicon switches 188 are reset at the end of each character period through the opening of a reed contact 234–A in the common anode circuit. This is controlled by suitable and obvious circuitry through the turning off of flip-flop 150.

Again, in this circuit, we are able to economize on circuit components by using the same silicon controlled switches 188 for the selective calling system, and again for operating the actual code coils in either a printer of a voice data unit. This interchange is accomplished without the use of changeover switches of circuit-making type, it being noted that the physical contact 234–A is not involved in the functional changeover, but is used simply to prevent the operation of the code coils, such as in an output printer, on every character of every message that may be going out to all of the remote stations.

ALTERNATE FOR RING COUNTER

It will be noted from the above that the same ring counter 156 (FIGS. 4 and 5) is used as a sequential pulse distributor for inserting a message from the keyboard to the magnetc recording drum (FIG. 3–A, where it is a component of distributor 95), for decoding in the station-recognition operation (FIG. 5) and for reading out recorded codes for controlling the printer or other manifesting device (FIG. 6). Other forms of pulse distributors can also be used in this manner.

Thus, in FIG. 7 (in which common elements carry the same legends and reference numbers as heretofore), a distributor is shown as comprising a rotating low-power commutator 300 sequentially stepped by a suitable pulse drive 302 from the 200 c.p.s. oscillator 154. The signals from the demodulator 120 are thus applied in timed sequence to the gate of the silicon switches 188 precisely as before, and printer control, station recognition and keyboard distribution are accomplished in the same manner as already described.

INCREMENTAL BUFFER STORAGE

FIG. 8 is a simplified and composite schematic diagram intended to be read along with FIG. 9, so that the mechanical or structural features of the latter, as they relate to what has been described above, can easily be visualized as they relate to the over-all operation. Thus, FIG. 8 shows the magnetic drum 94 and its record-reproduce head 96, arranged for control from keyboard 10 or from the receiving (recording) amplifier 122 of a radio receiver circuit. The reset circuit 106, and a reset-and-erase circuit 300 (also in FIG. 3–A) are indicated, the latter energized automatically whenever a received and recorded message has been completely fed out as to a printer or voice data unit 30. The "transmit" control key 100 of the keyboard 10 is shown operating the reset (without erase) control 106, to restore the disc 94 to its "farthest back" position from which, controlling oscillator 104, the device will transmit the inquiry message, prefaced by the station-identification codes.

Referring to FIG. 9 of the drawings, the preferred form of incremental buffer storage device itself is shown as mounted upon a base plate 300. This device performs a number of important functions, and to do this efficiently requires a combination of mechanical, magnetic, optical and electrical features. Among the functions to be performed are:

(a) The recording, as accurately spaced magnetized spots on a magnetic film or tape, of bit impulses constituting a lengthy set of code group. The bits from the source may arrive in time-serial form, and are recorded lengthwise of a narrow tape carried about the periphery of a drum. Each succeeding group is similarly recorded, but in a lengthwise displaced region or element of the tape.

(b) At the conclusion of the recording of a complete succession of code groups, the magnetic drum is restored to either of two different "home" or stop positions, in preparation for the reading out of those code groups either with or without certain prefix codes which are semi-permanently recorded on the magnetic medium ahead of the space devoted to erasable code group recordings.

(c) The reproducing, from the magnetically recorded code groups, of a corresponding output signal train of pulses or code groups with both the groups and the bits comprising them accurately spaced in time-serial form.

(d) The erasing of all of the recorded groups, and resetting of the apparatus, after reproduction of the codes for printer control or other manifestation.

In general, the arrangement of FIGURE 9 provides a rotatable drum or disc 94 carrying the magnetic tape and associated with a magnetic record, read and erase head indicated at 96 in the drawing, and shown disposed beneath the underside of base plate 300. The drum is journaled in the base plate and secured, on the upper side thereof, to a disc 306 whose hub 308 has secured thereto, and wrapped about it, a flexible drive ribbon 310 whose outer end is flexed about the arcuate extremity 312 of a drive arm 314 pivoted on a post 316 secured to plate 300. The drive arm 314 is of bifurcate construction, for rigidity, and the ribbon 310 is conveniently secured between the bifurcate arms where they adjoin one another as at 318. A cam projection 320 of the drive arm is arranged to engage and operate a set of contacts 322 when the disc 306 is in one of its "home" positions.

A spring 324 is coiled about the post 316 between drive arm 314 and the base plate, one end of the spring resting against a stop 326 and the other engaging, and biasing in the clockwise direction, the arm 314; and thus also biasing disc 306 in the clockwise direction.

Stepwise motion of the disc 306 in the counter-clockwise direction is accomplished by successive operations of a solenoid 328 whose plunger shaft 330 is pivotally connected as at 332 to a rocker 334 pivoted at 336 on the base plate. A coil spring 338 is connected to an upstanding protrusion of pivot pin 332, and connected at its other end to a fixed bracket 340, thus urging rocker 334 in the clockwise direction. A leaf spring drive pawl 342 is secured to a step formation on rocker 334, and has its free end bent to engage the successive ratchet teeth 344 of disc 306. A detent leaf spring 346 is fixedly mounted by bracket 348 and has its free end positioned to drop behind the successive ratchet teeth to prevent retrograde motion of disc 306 when spring pawl 342 is retracted in preparation for the following drive step. The usual adjustable limit stop 350 for the drive pawl 342 is indicated in the figure.

From the foregoing, it is apparent that each time solenoid 328 is energized, rocker 334 will swing counter-clockwise through a certain angle, sufficient to allow the drive pawl to drop behind the next tooth of ratchet 344; the disc 306 being held stationary by leaf spring 346. At the completion of this angular movement of the rocker, a projection thereon will operate a set of contact springs 352 for purposes to be described below.

Since, as shown, the drive pawl is engaged with the wheel ratchet teeth 344 even prior to energization of solenoid 328, this counter-clockwise rotation of rocker 334 causes pawl 342 to bow upward, and also causes an auxiliary leaf spring 335 on pawl 334 to engage the underside of pawl 342 and itself flex or bow. There are thus three forces acting on the ratchet tooth 344 tending to turn disc 306 counter-clockwise upon each de-energization of solenoid 328; (a) the flexure in pawl 342, (b) that in spring 335, and (c) the tension of coil spring 338.

When solenoid 328 is deenergized, as it will be upon commencement of each code-bit group, all of these forces are effective to give a rapid initial acceleration to pawl 342 and wheel 306. As rocker 334 turns clockwise, however, the flexure forces are released, and the remaining force, that of spring 338 alone, acts on the ratchet wheel.

The combination provides a nearly uniform velocity of the wheel, and hence of drum 94, throughout each step, in spite of its own considerable inertia and the slight tension in ribbon 310.

At the same time, the flexural forces in pawl 342 and leaf spring 335, until they have been released, act on pawl 334 in the direction tending to turn it counter-clockwise, or against the force of coil spring 338. The latter is highly tensioned, when solenoid 328 pulls in, and these counteracting forces tend initially to smooth out the otherwise excessively high initial speed that rocker 334 would attain immediately following release of solenoid 328.

Upon the de-energization of solenoid 328, the tension of spring 338 modified as above mentioned will rotate the rocker clockwise, and drive pawl 342 will index disc 306 one step in its counter-clockwise direction. In the condition shown in FIG. 9, solenoid 328 is de-energized, and rocker 334 occupies its maximum clockwise position. The clockwise rotation of the rocker, which will occur when the solenoid 328 is next de-energized, is employed to apply bit pulses in rapid succession to the magnetic head 96 by means of an optical switch distributor. One face of the rocker carries a reflector 354 to which a narrow beam of light is directed by lens 356 (in bracket 340), originating at a miniature lamp 358 mounted on the base plate 300. The usual beam-defining slit or aperture system is indicated at 360.

In the position of rocker 334 when solenoid 328 has operated, the reflected beam will be directed so as just to miss (as at X) a photo-sensitive unit 362 which is one of a series (7 are shown) of photo-sensitive devices generally designated 364, mounted on plate 300 with their light-sensitive faces disposed in an arcuate array approximately centered at the center of rotation of reflector 354. Hence, as rocker 334 executes the clockwise motion, after release of the solenoid, the light beam will move upwardly and successively strike the series of photo-sensitive devices to render them conductive (or current-generative) in sequence. The progressive change in the spacing of the devices 364 provides residual compensation for the change in velocity of rocker 334 as solenoid 328 accomplishes its stroke, to space the recorded pulses precisely along drum 94. The next time the solenoid is energized, sweeping the light beam downward along the array of cells, the activation thereof will produce no effect on the output circuits, because these cells are employed simply to discharge individual condensers in a manner fully analogous to the discharging of condensers 90-B of FIG. 5. During the backswing, then, the condensers contain no charges and the cell activations are idle ones.

Upon completion of the recording of the necessary number of code groups (constituting the entire message) upon the drum 94, and which may amount to 50 or more steps of disc 306, the disc and drum must be allowed to return rapidly to a "home" position. To this end, a relay 366 mounted on plate 300 by bracket 368 has the end of its pivoted actuating arm 370 positioned to engage a lip at the lower end of a release lever 372. This lever passes beneath bracket 368 via a clearance slot, extends upwardly to a point beneath disc 306, and thence is hooked leftwardly, to engage a pin on a control rocker 373 pivoted to the base plate at 374. An upstanding lug 376 on this release lever 372 operates, when the lever is shifted slightly downward by energization of relay 366, to deflect the spring pawl 342 out of engagement with the ratchet teeth 344. This operation is only permitted when the solenoid 328 is energized (the interlock is provided by contacts 352), so that the pawl guide 350 does not interfere with this action. The necessity can arise only occassionally, as the solenoid is normally energized in the absence of pulses and performs its drive function when momentarily de-energized, in the usual manner of stepper switch operation. The same slight downward (releasing) motion of release lever 372 also moves leaf spring detent 346 out of engagement with the ratchet teeth, the spring being deflected by a pin 380 on the control rocker 373, near its pivot 374.

The foregoing removes the impediments to the homing motion of disc 306 in the clockwise direction, under the impetus provided by spring 324, arm 314, and ribbon 310. To prevent an excessive return speed, a conventional two-armed pallet 382 is loosely pivoted at the leftward extremity of the rocker 373, as at 384. The downward "releasing" motion of lever 372 brings the pallet from its inactive position shown, to the position in which it will be oscillated by the ratchet teeth 344 and provide the usual governing action. It will be noted that the rocker arm 334 has a tip 386 which engages the underside of detent leaf spring 346, at a point intermediate its length; during the latter part of the clockwise rotation of rocker arm 334, this tip forces the detent positively into its position engaging the ratchet teeth, and precludes any possibility of disc rebound even if the detent's inertia and spring constant are such as to permit slight rebound at high stepping rates.

In order to provide two distinct and selectable stopping positions or "home" positions for disc 306 (and hence magnetic drum 94) to return to during its clockwise motion, a pin or the like 388 on the underside of disc 306 cooperates with one or the other of stepped faces of a slide 390 mounted on plate 300 by a pin-and-slot connection as shown. This slide may be normally urged to the right-hand extremity of its sliding motion by a spring 392, forming a stop for disc 306 such that point Z at which it is desired to commence the recording of code groups, is beneath head 96. When the control magnet coil 394 is energized in connection with the resetting operation, however, slide 390 is withdrawn to the left, and pin 388 is allowed to reach the second step on the slide, so that the point Z lies to the right of the position shown, and bringing beneath head 96 the point W, for example. The station-identifying codes are recorded in the region between Z and W, and hence will in the case just mentioned be sensed by head 96 as a preliminary to the sensing of the message groups recorded on the magnetic medium to the right of point Z.

To change the recorded code groups which designate the station, the service man manually holds out the slide 390 and operates the "insert message" key to allow the drum to restore to its fully home position, thus erasing the previous recognition code groups. He then operates the keyboard to record two (or more) new recognition code groups. Finally, it is necessary to reconnect the decoding matrix (FIG. 6) so that the new codes will be properly recognized when they are received as part of an incoming message.

The light-switch distributor of FIG. 8 is a convenient but optional means for distributing code groups to the buffer storage recorder; it may be replaced by a purely electronic distributor, such as a ring counter. One of the considerations dictating the use of a ring counter for distribution of the incoming addressing or station-identifying codes is the necessity for its operation upon the initial part of every message whether or not said message is intended for the station. Such frequent operation of a mechanical scanner is not desirable.

Whenever the station equipment is turned on, after an idle period, the recording drum is automatically reset, and its message codes erased. It is also reset, but without erasure of its message codes, when manifestation or read-out or printing of a received and recorded message has been completed.

While the system and parts constituting the improvements have been described and illustrated herein in considerable detail, so as to enable those skilled in the art to practice the invention, it is to be understood that the invention is not limited thereto, but can be varied in many respects that are intended to be encompassed by the scope of the invention, which is defined in the appended claims.

What is claimed is:

1. A receiving station for data-code information systems, comprising:
    (a) means for receiving groups of code pulse signals constituting a message,
    (b) means for displaying characters corresponding to received sequences of code pulsed groups,
    (c) means for comparing the initial code pulse groups of a received sequence with a predetermined code pattern peculiar to the receiving station,
    (d) means responsive to the output of said comparing means, upon equality of such comparison, for energizing said displaying means to display at said remote station the characters corresponding to the remainder of the received code pulse groups of the message, and
    (e) means responsive to a distinctive received "all-station" signal, for energizing said displaying means independently of the operation of said comparing means.

2. A receiving station for data-code information systems, comprising:
    (a) means for receiving groups of code pulse signals constituting a mesage,
    (b) means for displaying characters corresponding to received sequences of code pulse groups,
    (c) means for comparing the initial code pulse groups of a received sequence with a predetermined code pattern peculiar to the receiving station,
    (d) storage means for storing received code groups,
    (e) means responsive solely to the output of said comparing means, upon equality of such comparison, for activating said storage means to store the remainder of the received code groups of the message for later display of the corresponding message characters by said displaying means, and
    (f) means responsive to a distinctive received "all-station" signal, for activating said storage means independently of the operation of said comparing means.

References Cited

UNITED STATES PATENTS

| | | | |
|---|---|---|---|
| 3,305,839 | 2/1967 | Looschen et al. | 340—172.5 |
| 3,300,763 | 1/1967 | Hoehmann | 340—172.5 |
| 3,284,774 | 11/1966 | Leonard et al. | 340—172.5 |
| 3,266,018 | 8/1966 | Higgins | 340—151 |
| 3,230,509 | 1/1966 | Spencer | 340—167 |
| 3,181,124 | 4/1965 | Hammel | 340—172.5 |
| 3,134,016 | 5/1964 | Connolly et al. | 235—152 |
| 3,369,221 | 2/1968 | Lethin et al. | 340—172.5 |
| 3,297,996 | 1/1967 | Grady | 340—172.5 |

GARETH D. SHAW, Primary Examiner